(12) United States Patent
Yanatsubo et al.

(10) Patent No.: US 9,758,097 B2
(45) Date of Patent: Sep. 12, 2017

(54) REMAINING FUEL AMOUNT DISPLAY DEVICE

(71) Applicant: TOYOTA JIDOSHA KABUSHIKI KAISHA, Toyota-shi, Aichi-ken (JP)

(72) Inventors: Takashi Yanatsubo, Toyota (JP); Hiroshi Katoh, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/292,521

(22) Filed: Oct. 13, 2016

(65) Prior Publication Data

US 2017/0136946 A1 May 18, 2017

(30) Foreign Application Priority Data

Nov. 16, 2015 (JP) ................................. 2015-224255

(51) Int. Cl.
*B60Q 9/00* (2006.01)
*B60K 15/06* (2006.01)
*G01F 23/00* (2006.01)

(52) U.S. Cl.
CPC .............. *B60Q 9/00* (2013.01); *B60K 15/061* (2013.01); *G01F 23/00* (2013.01)

(58) Field of Classification Search
CPC ..................................................... B60Q 9/00
USPC .............. 340/450, 425.5, 506, 539.1, 539.11
See application file for complete search history.

(56) References Cited

U.S. PATENT DOCUMENTS

2015/0213657 A1* 7/2015 Tanaka ................... G07C 5/008
                                                                    701/123
2017/0136946 A1* 5/2017 Yanatsubo ............... B60Q 9/00

FOREIGN PATENT DOCUMENTS

| JP | 2010-096522 A | 4/2010 |
| JP | 2010-243368 A | 10/2010 |
| JP | 2014-157021 A | 8/2014 |
| JP | 2015-017925 A | 1/2015 |

* cited by examiner

*Primary Examiner* — Daryl Pope
(74) *Attorney, Agent, or Firm* — Oliff PLC

(57) ABSTRACT

A remaining fuel amount display device including: a fuel gauge; a sensor that detects the remaining fuel amount of the fuel tank; and an electronic control unit that calculates an indication value of the fuel gauge. The electrical control unit calculates the indication value by subtracting a subtraction value from a last indication value when the last indication value is greater than a detected value of the remaining fuel amount. The last indication value is calculated at one time before the indication value. The subtraction value is greater than a latest fuel consumption amount in an interval of the calculation of the indication value and equal to or less than a sum of the fuel consumption amount and a difference between the last indication value and the detected value. The subtraction value becomes larger when a value obtained by comparing the last indication value with the detected value is larger.

7 Claims, 2 Drawing Sheets

REMAINING FUEL AMOUNT DISPLAY DEVICE

INCORPORATION BY REFERENCE

The disclosure of Japanese Patent Application No. 2015-224255 filed on Nov. 16, 2015 including the specification, drawings and abstract is incorporated herein by reference in its entirety.

BACKGROUND

1. Field of the Disclosure

The present disclosure relates to a remaining fuel amount display device.

2. Description of Related Art

A fuel tank is typically provided with a fuel sender (remaining fuel amount detection unit) which detects a remaining fuel amount. Since the fuel sender detects the remaining fuel amount with the liquid level of fuel in the fuel tank, a detected value fluctuates due to fuel oscillation or the like according to the behavior of the vehicle. Accordingly, if the detected value of the fuel sender is displayed on a fuel gauge provided in a meter or the like in the vehicle interior as a remaining fuel amount as it is, the indication value of the fuel gauge which should be decreased little by little except for during refueling rapidly fluctuates up and down, or the like, and a driver or the like may feel discomfort. For this reason, a technique for suppressing rapid fluctuation of the indication value of the fuel gauge has been suggested (for example, Japanese Patent Application Publication No. 2015-17925 (JP 2015-17925 A)).

In JP 2015-17925 A, since the indication value of the fuel gauge is calculated by sequentially subtracting a subtraction value according to a fuel consumption amount from a detected value of the fuel sender when refueling is completed, it is possible to prevent rapid fluctuation of the indication value of the fuel gauge according to the behavior of the vehicle or the like. However, in order to prevent increase of a difference between the indication value of the fuel gauge and the detected value of the fuel sender due to accumulation of errors in calculation of the subtraction value, in a case where the indication value of the fuel gauge tends to continue to be smaller than the detected value of the fuel sender, the above-described subtraction value (a correction coefficient by which the fuel consumption amount is multiplied) is made small, and in a case where the indication value of the fuel gauge tends to continue to be larger than the detected value of the fuel sender, the above-described subtraction value (correction coefficient) is made large.

In the technique described in JP 2010-243368 A, when sequentially updating the indication value of the fuel gauge according to the detected value of the fuel sender, the change rate of the indication value of the fuel gauge is limited to a comparatively low rate, thereby suppressing rapid fluctuation of the indication value of the fuel gauge according to the behavior of the vehicle or the like.

SUMMARY

More stringent regulations relating to evaporated fuel gas discharge and the like have lead to improvement in airtightness of fuel tanks, and in many cases, a resin-based fuel tank having a high degree of freedom in shape is used. For this reason, the detected value of the fuel sender may change greatly due to deformation or the like of the fuel tank caused by change in internal pressure of the fuel tank, and the detected value of the fuel sender may be deviated greatly from the indication value of the fuel gauge.

However, in the technique described in JP 2015-17925 A, while measures to suppress the increase of the difference between the indication value of the fuel gauge and the detected value of the fuel sender are taken, a case where the detected value of the fuel sender changes greatly and thus cause errors is not taken into consideration. Furthermore, in the technique described in JP 2010-243368 A, even in a case where the indication value of the fuel gauge is deviated greatly from the detected value of the fuel sender, the change rate of the indication value of the fuel gauge is limited to a comparatively low rate. For this reason, in a case where the detected value of the fuel sender is deviated greatly from the indication value of the fuel gauge, it may not be possible to quickly match the indication value of the fuel gauge with the detected value of the fuel sender.

In a case where the deviation between the indication value of the fuel gauge and the detected value of the fuel sender is small, if the indication value of the fuel gauge quickly changes, the driver feels discomfort; thus, it is preferable to make the indication value of the fuel gauge become gradually closer to the detected value of the fuel sender.

The disclosure provides a remaining fuel amount display device capable of, in a case where an indication value of a fuel gauge is greater than a detected value of a remaining fuel amount detection unit, when the difference between the indication value of the fuel gauge and the detected value of the remaining fuel amount detection unit is large, making the indication value of the fuel gauge become quickly closer to the detected value of the remaining fuel amount detection unit, and when the difference between the indication value of the fuel gauge and the detected value of the remaining fuel amount detection unit is small, making the indication value of the fuel gauge become gradually closer to the detected value of the remaining fuel amount detection unit.

A remaining fuel amount display device, according to an aspect of the disclosure includes: a fuel gauge provided in a vehicle interior of a vehicle and configured to display a remaining fuel amount of a fuel tank; a sensor configured to detect the remaining fuel amount of the fuel tank; and an electronic control unit configured to calculate an indication value of the fuel gauge based on the remaining fuel amount detected by the sensor, update the display of the fuel gauge with the indication value, and calculate a fuel consumption amount in an engine of the vehicle which is a fuel consumption amount within an interval during which the indication value is calculated. The electrical control unit is configured to calculate the indication value by subtracting a subtraction value from a last indication value when the last indication value is greater than a detected value of the remaining fuel amount detected by the sensor. The last indication value is an indication value calculated by the electrical control unit in calculation at one time before the calculation of the indication value. The subtraction value is a value which is greater than a latest fuel consumption amount calculated by the electrical control unit and equal to or less than a sum of the fuel consumption amount and a difference between the last indication value and the detected value The subtraction value becomes larger when a value obtained by comparing the last indication value with the detected value is larger.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
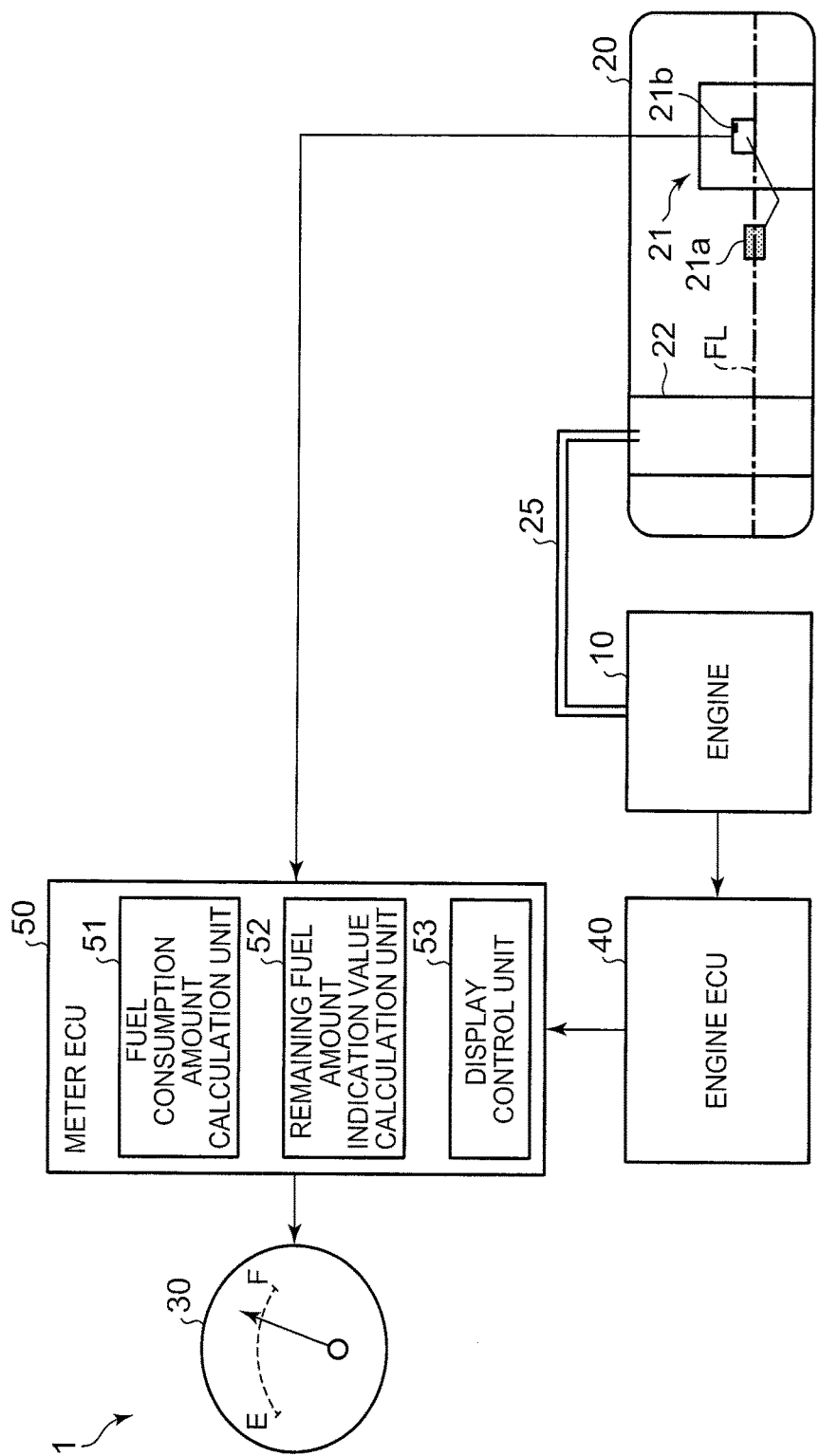
FIG. 1 is a block diagram schematically showing an example of the configuration of a remaining fuel amount display device according to this embodiment.

Hereinafter, a mode for carrying out the disclosure will be described referring to the drawings.

FIG. 1 is a block diagram schematically showing an example of the configuration of a remaining fuel amount display device 1 according to this embodiment. The remaining fuel amount display device 1 displays a remaining fuel amount in a fuel tank 20 which stores fuel (gasoline, light oil, liquefied petroleum gas, or the like) for operating an engine 10 as a drive power source of a vehicle. The remaining fuel amount display device 1 includes a fuel sender (an example of a remaining fuel amount detection unit) 21 which is provided in fuel tank 20, a fuel gauge 30, an engine electronic control unit (ECU) 40, and a meter ECU 50.

Hereinafter, unless otherwise specified, a "vehicle" indicates a vehicle in which the remaining fuel amount display device 1 is mounted.

The engine 10 is an internal combustion engine as a drive power source of the vehicle, and receives the supply of fuel from a fuel pump 22 provided in the fuel tank 20 through a fuel pipe 25.

The fuel tank 20 stores fuel which is to be supplied to the engine 10. In the fuel tank 20, as described above, the fuel sender 21 is incorporated.

The fuel sender 21 detects the remaining fuel amount in the fuel tank 20. The fuel sender 21 includes a float 21a and an output unit 21b.

The float 21a is a float which floats on a liquid level FL of fuel in the fuel tank 20. The float 21a is coupled to the output unit 21b, and changes in position (rotationally moves) around the output unit 21b according to change in the liquid level FL.

The output unit 21b outputs a detection signal according to the position (the liquid level FL of fuel in the fuel tank 20) of the float 21a to the meter ECU 50. The output unit 21b includes, for example, a variable resistor whose resistance value changes with change in the position of the float 21a, and outputs a voltage value according to the resistance value of the variable resistor to the meter ECU 50 as a detection signal. Furthermore, the output unit 21b includes, for example, a permanent magnet which is operable in association with change in the position of the float 21a, and a hall IC which changes in output voltage according to change (change in magnetic field) in the position of the permanent magnet. The output unit 21b outputs the output voltage of the hall IC to the meter ECU 50 as a detection signal.

The fuel gauge 30 is provided in a meter in the vehicle interior, and existing remaining fuel amount display means for displaying the remaining fuel amount of the fuel tank 20. In the drawings, as an example, although an analog type (for example, a cross coil type, a bimetal type, or the like) fuel gauge 30 is shown, the fuel gauge 30 may be a digital display type fuel gauge 30 which is displayed in a bar graph divided into a plurality of segments on a liquid crystal panel or the like.

The engine ECU 40 is an electronic control unit which executes various kinds of operation control of the engine 10. The engine ECU 40 is constituted of, for example, a microcomputer or the like, and can realize various kinds of control processing by executing various programs stored in a read-only memory (ROM) on a (central processing unit (CPU).

The engine ECU 40 determines a fuel injection amount (specifically, an applied voltage value to an injector) into a cylinder of the engine 10 according to the traveling state (vehicle speed and the like), the operation state (accelerator opening, shift position, and the like), or the like of the vehicle and executes operation control of the engine 10. The engine ECU 40 transmits information (fuel injection amount information) relating to the fuel injection amount to the meter ECU 50 through an on-vehicle local area network (LAN), such as a controller area network (CAN).

The meter ECU 50 is an electronic control unit which executes display control relating to various kinds of display in the meter. The meter ECU 50 is constituted of, for example, a microcomputer and the like, and can realize various kinds of control processing by executing various programs stored in a ROM. The meter ECU 50 includes, as functional units to be realized by executing one or more programs on a CPU, a fuel consumption amount calculation unit 51, a remaining fuel amount indication value calculation unit 52, and a display control unit 53.

The fuel consumption amount calculation unit 51 calculates a fuel consumption amount FC for a predetermined time in the engine 10 based on the fuel injection amount information received from the engine ECU 40. The predetermined time corresponds to a period (a predetermined time T described below) in which the remaining fuel amount indication value calculation unit 52 calculates the indication value of the fuel gauge 30. That is, the fuel consumption amount calculation unit 51 calculates the fuel consumption amount FC within an interval during which the indication value is calculated by the remaining fuel amount indication value calculation unit 52. Specifically, the fuel consumption amount calculation unit 51 can sequentially calculate the above-described fuel consumption amount FC by integrating the fuel injection amount included in the fuel injection amount information received from the engine ECU 40 by the number of times corresponding to the predetermined time T.

The remaining fuel amount indication value calculation unit 52 calculates an indication value H of the remaining fuel amount in the fuel gauge 30 based on a detected value AF of the remaining fuel amount of the fuel tank 20 detected by the fuel sender 21, or the like. The details of processing (indication value calculation processing) for calculating the indication value H by the remaining fuel amount indication value calculation unit 52 will be described below.

The detected value AF of the fuel sender 21 for use in calculating the indication value H is, for example, an average value of detected values detected by the fuel sender 21 multiple times within an interval (predetermined time T) during which the indication value H is calculated.

The display control unit 53 executes processing (remaining fuel amount display processing) for updating the display of the remaining fuel amount of the fuel tank 20 in the fuel gauge 30 based on the indication value H sequentially calculated by the remaining fuel amount indication value calculation unit 52. The correspondence relationship between a position indicated by a needle of the fuel gauge 30 (in a case where the fuel gauge 30 is of a digital type, the number of segments to be turned on in a bar graph) and the indication value H calculated by the remaining fuel amount indication value calculation unit 52 is defined in advance, and the display control unit 53 performs the remaining fuel amount display processing based on the correspondence relationship.

Next, the details of the indication value calculation processing by the remaining fuel amount indication value calculation unit 52 will be described.

Figure 2:
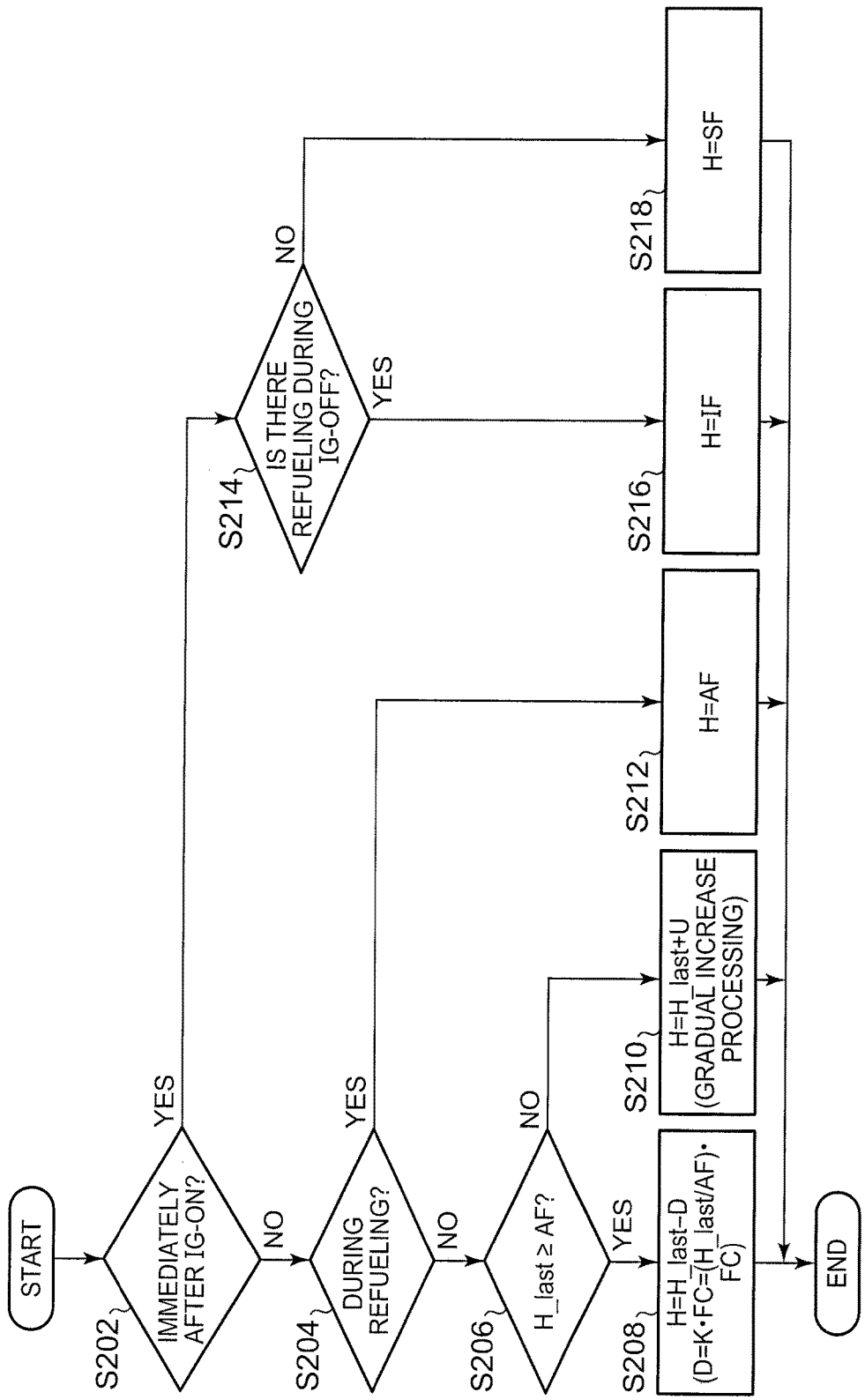
FIG. 2 is a flowchart schematically showing an example of processing by a meter ECU (remaining fuel amount indication value calculation unit).

FIG. 2 is a flowchart schematically showing an example of the indication value calculation processing by the meter ECU 50 (remaining fuel amount indication value calculation unit 52) according to this embodiment. This flowchart is repeatedly performed at each predetermined time T from the completion of initial processing after ignition-on (IG-ON) of the vehicle to ignition-off (IG-OFF) of the vehicle.

In Step S202, the remaining fuel amount indication value calculation unit 52 determines whether or not it is immediately after IG-ON of the vehicle, that is, it is first processing after the completion of initial processing. The remaining fuel amount indication value calculation unit 52 progresses to Step S204 in a case where it is not immediately after IG-ON, and progresses to Step S214 in a case where it is immediately after IG-ON.

In Step S204, the remaining fuel amount indication value calculation unit 52 determines whether or not refueling is performed (IG-ON refueling determination). The remaining fuel amount indication value calculation unit 52 progresses to Step S206 in a case where it is determined that refueling is not performed, and progresses to Step S212 in a case where it is determined that refueling is performed.

A method for IG-ON refueling determination may be arbitrary. For example, the meter ECU 50 performs processing for storing and updating the detected value AF of the fuel sender 21 in an internal memory as a reference value SF each time the time defined in advance elapses. The remaining fuel amount indication value calculation unit 52 determines that refueling is performed in a case where the latest detected value AF of the fuel sender 21 is increased by a predetermined amount (for example, 5 L) or more from the reference value SF.

In Step S206, the remaining fuel amount indication value calculation unit 52 determines whether a last calculated indication value (last indication value) H_last is equal to or greater than the latest detected value AF of the fuel sender 21. The remaining fuel amount indication value calculation unit 52 progresses to Step S208 in a case where the last indication value H_last is equal to or greater than the latest detected value AF of the fuel sender 21, and progresses to Step S210 in a case where the last indication value H_last is smaller than the latest detected value AF of the fuel sender 21.

In Step S208, the remaining fuel amount indication value calculation unit 52 calculates the indication value H by subtracting a subtraction value D (>0) from the last indication value H_last as shown in Expression (1) described below.

$$H = H\_last - D \quad (1)$$

The subtraction value D is a value obtained by multiplying the latest fuel consumption amount FC for the predetermined time T in the engine 10 calculated by the fuel consumption amount calculation unit 51 by a subtraction coefficient K as shown in Expression (2) described below. The subtraction coefficient K is a value obtained by dividing the last indication value H_last by the latest detected value AF of the fuel sender 21.

$$D = K \cdot FC = (H\_last/AF) \cdot FC \quad (2)$$

In a case where the last indication value H_last is greater than the latest detected value AF, since the subtraction coefficient K becomes a value greater than 1, the subtraction value D becomes larger than the latest fuel consumption amount FC. In a case where the last indication value H_last is greater than the latest detected value AF, the subtraction value D (subtraction coefficient K) becomes larger as a value obtained by comparing the last indication value H_last with the latest detected value AF is larger.

The fuel consumption amount FC for the predetermined time T in the engine 10 is typically smaller than the detected value AF of the fuel sender 21. For this reason, a value ΔD which is a portion in the subtraction value D (=FC+ΔD) greater than the fuel consumption amount FC becomes smaller than the difference between the last indication value H_last and the latest detected value AF as shown in Expression (3) described below. That is, the subtraction value D becomes smaller than the sum of the latest fuel consumption amount FC and the difference between the last indication value H_last and the latest detected value AF.

$$\Delta D = \{(H\_last - AF)/AF\} \cdot FC = (H\_last - AF) \cdot FC/AF < H\_last - AF \quad (3)$$

In Step S210, the remaining fuel amount indication value calculation unit 52 performs processing (gradual increase processing) for gradually increasing the indication value H toward the latest detected value AF. The remaining fuel amount indication value calculation unit 52 calculates the indication value H by adding an adding value U (>0) to the last indication value H_last as shown in Expression (4) described below.

$$H = H\_last + U \quad (4)$$

The adding value U is a smaller value between a maximum adding value Umax defined in advance and a value obtained by subtracting the last indication value H_last from the latest detected value AF as shown in Expression (5) described below. The maximum adding value Umax is a limit value within a range without causing the driver to feel discomfort as an increase in the remaining fuel amount (indication value H) in the fuel gauge 30 for predetermined time T as a calculation period (update period) of the indication value H, and is defined in advance based on an experiment, a simulation, or the like.

$$U = \min(U\max, AF - H\_last) \quad (5)$$

In Step S204, in a case where it is determined that refueling is performed, in Step S212, the remaining fuel amount indication value calculation unit 52 calculates (sets) the latest detected value AF as the indication value H.

In Step S202, in a case where it is determined that it is immediately after IG-ON, in Step S214, the remaining fuel amount indication value calculation unit 52 determines whether or not there is refueling during IG-OFF of the vehicle (IG-OFF refueling determination). The remaining fuel amount indication value calculation unit 52 progresses to Step S216 in a case where it is determined that there is refueling during IG-OFF, and progresses to Step S218 in a case where it is determined that there is no refueling during IG-OFF.

A method for IG-OFF refueling determination may be arbitrary. For example, the remaining fuel amount indication value calculation unit 52 determines that refueling is performed in a case where, after initial processing ends, the first detected value (initial detected value) IF of the fuel sender 21 is increased by a predetermined amount (for example, 5

L) or more from a reference value (a reference value finally updated before the present initial processing) SF.

In Step S216, the remaining fuel amount indication value calculation unit 52 calculates (sets) an initial detected value IF of the fuel sender 21 as the indication value H (H=IF).

The initial detected value IF is, for example, an average value of the initial detected values of the fuel sender 21 for a predetermined number of times after the initial processing of the meter ECU 50 is completed.

In Step S218, the remaining fuel amount indication value calculation unit 52 calculates (sets) the reference value (the reference value finally updated before the present initial processing) SF as the indication value H (H=SF).

In this way, the remaining fuel amount display device 1 according to this embodiment includes the fuel gauge 30 which is provided in the vehicle interior of the vehicle and displays the remaining fuel amount of the fuel tank 20, the fuel sender 21 which detects the remaining fuel amount of the fuel tank 20, the remaining fuel amount indication value calculation unit 52 which sequentially calculates the indication value H of the remaining fuel amount in the fuel gauge 30 based on the remaining fuel amount detected by the fuel sender 21, the display control unit 53 which updates the display of the fuel gauge 30 with the indication value H sequentially calculated by the remaining fuel amount indication value calculation unit 52, and the fuel consumption amount calculation unit 51 which calculates the fuel consumption amount FC in the engine 10 of the vehicle as the fuel consumption amount FC within the interval (predetermined time T) during which the indication value H is calculated by the remaining fuel amount indication value calculation unit 52. The remaining fuel amount indication value calculation unit 52 calculates the indication value H by subtracting the subtraction value D, which is greater than the latest fuel consumption amount FC calculated by the fuel consumption amount calculation unit 51 and equal to or less than the sum of the fuel consumption amount FC and the difference between the last indication value H_last and the detected value AF and becomes larger when the value obtained by comparing the last indication value H_last with the detected value AF is larger, from the last indication value H_last in a case where the last indication value H_last is greater than the detected value AF of the fuel sender 21. For this reason, in a case where the indication value (last indication value H_last) of the fuel gauge 30 is greater than the detected value AF of the fuel sender 21, the new indication value H of the fuel gauge 30 is calculated by subtracting the subtraction value D, which is greater than the latest fuel consumption amount FC and equal to or less than the sum of the fuel consumption amount FC and the difference between the last indication value H_last and the detected value AF, from the last indication value H_last. Accordingly, it is possible to make the indication value of the fuel gauge 30 become closer to the detected value AF of the fuel sender 21. In a case where the indication value (last indication value H_last) of the fuel gauge 30 is greater than the detected value AF of the fuel sender 21, the new indication value of the fuel gauge 30 is calculated by subtracting the subtraction value D, which becomes larger when the value obtained by comparing the indication value (last indication value H_last) of the fuel gauge 30 with the detected value AF of the fuel sender 21 is larger, from the last indication value H_last. Accordingly, in a case where the indication value (last indication value H_last) of the fuel gauge 30 is greater than the detected value AF of the fuel sender 21, the larger the value is obtained by comparing the indication value of the fuel gauge 30 with the detected value AF of the fuel sender 21, the more greatly the indication value of the fuel gauge 30 can be decreased. That is, in a case where the indication value (last indication value H_last) of the fuel gauge 30 is greater than the detected value AF of the fuel sender 21, when the difference between the indication value (last indication value H_last) of the fuel gauge 30 and the detected value AF of the fuel sender 21 is large, it is possible to make the indication value of the fuel gauge 30 become quickly closer to the detected value AF of the fuel sender 21, and when the difference between the indication value (last indication value H_last) of the fuel gauge 30 and the detected value AF of the fuel sender 21 is small, it is possible to make the indication value of the fuel gauge 30 become gradually closer to the detected value AF of the fuel sender 21.

The subtraction value D is a value obtained by multiplying the latest fuel consumption amount FC calculated by the fuel consumption amount calculation unit 51 by the subtraction coefficient K obtained by dividing the last indication value H_last by the detected value AF of the fuel sender 21. For this reason, the subtraction value D becomes larger when the value obtained by comparing the indication value (last indication value H_last) of the fuel gauge 30 with the detected value AF of the fuel sender 21 is larger. Further, the subtraction value D becomes larger when the detected value AF of the fuel sender 21 is smaller. Accordingly, in a state where the detected value AF of the fuel sender 21 is comparatively small, even if the difference between the indication value (last indication value H_last) of the fuel gauge 30 and the detected value AF of the fuel sender 21 is identical, it is possible to make the indication value of the fuel gauge 30 become more quickly closer to the detected value AF of the fuel sender 21; thus, it is possible to quickly make the driver of the vehicle or the like be aware of a decrease in the remaining fuel amount and to appropriately suppress the occurrence of running out of gasoline.

Although the mode for carrying out the disclosure has been described in detail, the disclosure is not limited to this specific embodiment, and various modifications and alterations can be made without departing from the gist of the disclosure.

For example, in the above-described embodiment, although the subtraction coefficient K is a value obtained by dividing the last indication value H_last by the detected value AF of the fuel sender 21, the disclosure is not limited to this form. For example, the subtraction coefficient K may be a value obtained by further multiplying a value obtained by dividing the last indication value H_last by the detected value AF of the fuel sender 21 by a constant a greater than 1 as shown in Expression (6) described below. The constant a is set such that the indication value H does not fall below the next detected value AF of the fuel sender 21, that is, such that the value $\Delta D$ which is a portion in the subtraction value D (=FC+$\Delta D$) greater than the fuel consumption amount FC becomes equal to or less than the difference between the last indication value H_last and the detected value AF. In this case, the subtraction value D is greater than the latest fuel consumption amount FC calculated by the fuel consumption amount calculation unit 51 and equal to or less than the sum of the fuel consumption amount FC and the difference between the last indication value H_last and the detected value AF, and becomes larger when the value obtained by comparing the last indication value H_last with the detected value AF is larger. For this reason, the same functional effects as those in the above-described embodiment are obtained.

$$D = K \cdot FC = \{a \cdot (H\_last/AF)\} \cdot FC \quad (6)$$

In the above-described embodiment, although the subtraction value D is a value obtained by multiplying the subtraction coefficient K by the latest fuel consumption amount FC, the disclosure is not limited to this form. For example, as shown in Expression (7) described below, the subtraction value D may be the sum of the latest fuel consumption amount FC and a value obtained by multiplying the difference between the last indication value H_last and the detected value AF of the fuel sender 21 by a constant b.

$$D = FC + b \cdot (H\_last - AF) \quad (7)$$

The constant b is set to $0 < b \le 1$ such that the indication value H does not fall below the next detected value AF of the fuel sender 21, that is, the value $\Delta D$ which is a portion in the subtraction value D (=FC+$\Delta D$) greater than the fuel consumption amount FC becomes equal to or less than the difference between the last indication value H_last and the detected value AF.

In the above-described case, the subtraction value D is greater than the latest fuel consumption amount FC calculated by the fuel consumption amount calculation unit 51 and equal to or less than the sum of the fuel consumption amount FC and the difference between the last indication value H_last and the detected value AF and becomes larger when the difference between the last indication value H_last and the detected value AF is larger. That is, the subtraction value D becomes larger when the value obtained by comparing the last indication value H_last with the detected value AF is larger. For this reason, the same functional effects as those in the above-described embodiment are obtained.

In the above-described embodiment, although the subtraction value D continuously changes with change of the difference between the last indication value H_last and the detected value AF of the fuel sender 21, an aspect in which the subtraction value D changes in a stepwise manner may be made, and the same applies to modification examples using Expressions (6) and (7) described above. In this case, the same functional effects as those in the above-described embodiment are obtained.

In the above-described embodiment, although, in a case where the last indication value H_last is smaller than the latest detected value AF of the fuel sender 21 (No in Step S206 of FIG. 2), the remaining fuel amount indication value calculation unit 52 executes the gradual increase processing (Step S210 of FIG. 2), the disclosure is not limited to this aspect. For example, even in a case where the last indication value H_last is smaller than the latest detected value AF of the fuel sender 21, the indication value H may be calculated using Expression (2). In a case where the last indication value H_last is smaller than the latest detected value AF of the fuel sender 21, the subtraction coefficient K becomes smaller than 1, and when the value obtained by comparing the last indication value H_last and the detected value AF of the fuel sender 21 is larger, a decrease in the indication value of the fuel gauge 30 can be made smaller. For this reason, even with a more gradual pace than the gradual increase processing, it is possible to make the indication value of the fuel gauge 30 become closer to the detected value of the fuel sender 21.

What is claimed is:

1. A remaining fuel amount display device comprising:
   a fuel gauge provided in a vehicle interior of a vehicle and configured to display a remaining fuel amount of a fuel tank;
   a sensor configured to detect the remaining fuel amount of the fuel tank; and
   an electronic control unit configured to
   calculate an indication value of the fuel gauge based on the remaining fuel amount detected by the sensor,
   update the display of the fuel gauge with the indication value, and
   calculate a fuel consumption amount in an engine of the vehicle which is a fuel consumption amount within an interval during which the indication value is calculated,
   wherein
   the electrical control unit is configured to calculate the indication value by subtracting a subtraction value from a last indication value when the last indication value is greater than a detected value of the remaining fuel amount detected by the sensor,
   the last indication value is an indication value calculated by the electrical control unit in calculation at one time before the calculation of the indication value,
   the subtraction value is a value which is greater than a latest fuel consumption amount calculated by the electrical control unit and equal to or less than a sum of the fuel consumption amount and a difference between the last indication value and the detected value, and
   the subtraction value becomes larger when a value obtained by comparing the last indication value with the detected value is larger.

2. The remaining fuel amount display device according to claim 1, wherein
   the subtraction value is a value which becomes larger when the difference between the last indication value and the detected value is larger.

3. The remaining fuel amount display device according to claim 2, wherein
   the subtraction value is a value obtained by multiplying the latest fuel consumption amount by a coefficient obtained by multiplying the difference between the last indication value and the detected value by a constant greater than 0 and equal to or less than 1.

4. The remaining fuel amount display device according to claim 1,
   wherein the subtraction value is a value obtained by multiplying the latest fuel consumption amount by a coefficient which becomes larger when a value obtained by dividing the last indication value by the detected value becomes larger.

5. The remaining fuel amount display device according to claim 1, wherein
   the subtraction value is a value obtained by multiplying the latest fuel consumption amount by a coefficient obtained by dividing the last indication value by the detected value or a coefficient obtained by multiplying a constant greater than 1 by a value obtained by dividing the last indication value by the detected value.

6. The remaining fuel amount display device according to claim 1, wherein
   the electrical control unit is configured to calculate the indication value by adding a smaller value between a predetermined maximum adding value and a value obtained by subtracting the last indication value from the detected value to the last indication value when the last indication value is smaller than the detected value.

7. The remaining fuel amount display device according to claim 1, wherein
   the electrical control unit is configured to determine that the vehicle is being refueled when the detected value increases by a predetermined threshold or more from a last detected value and is configured to set the detected value as the indication value when the electrical control unit determines that the vehicle is being refueled.

* * * * *